US010037631B2

(12) United States Patent
Berkobin

(10) Patent No.: US 10,037,631 B2
(45) Date of Patent: Jul. 31, 2018

(54) SMART DONGLE FOR USE WITH TELEMATICS DEVICES

(71) Applicant: Verizon Patent and Licensing Inc., Arlington, VA (US)

(72) Inventor: Alex Berkobin, Atlanta, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 257 days.

(21) Appl. No.: 14/495,119

(22) Filed: Sep. 24, 2014

(65) Prior Publication Data

US 2016/0086390 A1    Mar. 24, 2016

(51) Int. Cl.
*G07C 5/00* (2006.01)
*B60K 35/00* (2006.01)
*G07C 5/08* (2006.01)

(52) U.S. Cl.
CPC .............. *G07C 5/008* (2013.01); *B60K 35/00* (2013.01); *G07C 5/0808* (2013.01)

(58) Field of Classification Search
USPC ........................................................ 701/123
See application file for complete search history.

(56) References Cited

U.S. PATENT DOCUMENTS

| | | | | |
|---|---|---|---|---|
| 4,400,779 A * | 8/1983 | Kosuge | ............ | G01F 9/023 701/123 |
| 5,301,113 A * | 4/1994 | To | ............ | G01F 9/001 701/123 |
| 6,467,337 B2 * | 10/2002 | Sadahiro | ............ | G01F 23/0007 340/450.2 |
| 6,629,029 B1 * | 9/2003 | Giles | ............ | G01M 17/007 701/31.4 |
| 6,725,151 B2 * | 4/2004 | Itou | ............ | B60L 11/1881 280/834 |
| 7,412,313 B2 * | 8/2008 | Isaac | ............ | G01C 21/3679 701/123 |
| 8,406,948 B2 * | 3/2013 | Wang | ............ | B60L 3/12 340/438 |
| 8,504,236 B2 * | 8/2013 | Guo | ............ | G01C 21/3697 340/450.2 |
| 8,930,125 B2 * | 1/2015 | Fasse | ............ | B60L 3/0046 180/65.21 |

(Continued)

FOREIGN PATENT DOCUMENTS

| | | | | |
|---|---|---|---|---|
| JP | 2004063205 A | * | 2/2004 | |
| KR | 100903590 B1 | * | 6/2009 | ......... B60R 16/0236 |
| WO | WO 2011019240 A2 | * | 2/2011 | ............. B60K 35/00 |

*Primary Examiner* — Shelley Chen

(57) ABSTRACT

A smart dongle device may comprise a connector configured to plug into and be removable from an ECU/diagnostic connector of a vehicle, a transceiver configured to communicatively connect with a remote device, and a processor and a memory having a program communicatively connected to the processor. The processor may be configured to read vehicle information including at least one ECU output from the ECU connector, store the vehicle information, process the vehicle information, and send the vehicle information to the remote device. The processor may further be configured to determine energy levels stored by a vehicle before and after a trip and generate a remaining range and a total energy capacity based in part on the energy levels, wherein the total energy capacity of the vehicle is not directly available through the ECU/diagnostic connector.

20 Claims, 4 Drawing Sheets

(56) References Cited

U.S. PATENT DOCUMENTS

| | | | |
|---|---|---|---|
| 9,163,953 B2* | 10/2015 | Tuzi | B60K 15/00 |
| 2007/0097566 A1* | 5/2007 | Woods | B24B 23/028 |
| | | | 361/33 |
| 2008/0167812 A1* | 7/2008 | Geelen | G01C 21/3641 |
| | | | 701/469 |
| 2009/0043442 A1* | 2/2009 | Zopf | G01M 13/02 |
| | | | 701/31.4 |
| 2009/0216732 A1* | 8/2009 | Feng | G01C 21/3611 |
| 2010/0076615 A1* | 3/2010 | Daniel | F03D 9/00 |
| | | | 700/293 |
| 2010/0106514 A1* | 4/2010 | Cox | G01C 21/20 |
| | | | 705/1.1 |
| 2010/0138142 A1* | 6/2010 | Pease | B60L 11/1851 |
| | | | 701/123 |
| 2010/0138363 A1* | 6/2010 | Batterberry | G06Q 10/04 |
| | | | 705/412 |
| 2010/0145987 A1* | 6/2010 | Harper | G06F 9/4843 |
| | | | 707/770 |
| 2010/0264726 A1* | 10/2010 | Dechwanapong | B60R 16/0236 |
| | | | 307/9.1 |
| 2011/0046834 A1* | 2/2011 | Grider | B60W 10/06 |
| | | | 701/22 |
| 2011/0276260 A1* | 11/2011 | Sim | G01F 9/023 |
| | | | 701/123 |
| 2012/0116620 A1* | 5/2012 | Wang | B60L 3/12 |
| | | | 701/22 |
| 2012/0191289 A1* | 7/2012 | Guo | G01C 21/3697 |
| | | | 701/29.1 |
| 2012/0239283 A1* | 9/2012 | Fasse | B60L 3/0046 |
| | | | 701/123 |
| 2013/0073169 A1* | 3/2013 | Emberson | F02D 28/00 |
| | | | 701/99 |
| 2013/0090792 A1* | 4/2013 | Eom | B60R 16/0236 |
| | | | 701/22 |
| 2014/0067231 A1* | 3/2014 | Mosher | F02D 28/00 |
| | | | 701/102 |

* cited by examiner

SMART DONGLE FOR USE WITH TELEMATICS DEVICES

BACKGROUND

Aftermarket on-board diagnostics devices may be used to request diagnostic data from a vehicle that is not displayed to a driver. Typically, these devices are coupled to an electronic control unit (ECU) of the vehicle via an ECU/diagnostic connector of the vehicle. Data may be provided by diagnostic devices in the form of an on-board diagnostics parameter ID (PID), which is a code indicating diagnostic information. The PID may be interpreted or decoded according to a diagnostic standard, such as SAE J1979. However, PIDs traditionally cannot be directly retrieved from the ECU/diagnostic connector to provide a total energy capacity of the vehicle.

DETAILED DESCRIPTION

Figure 1:
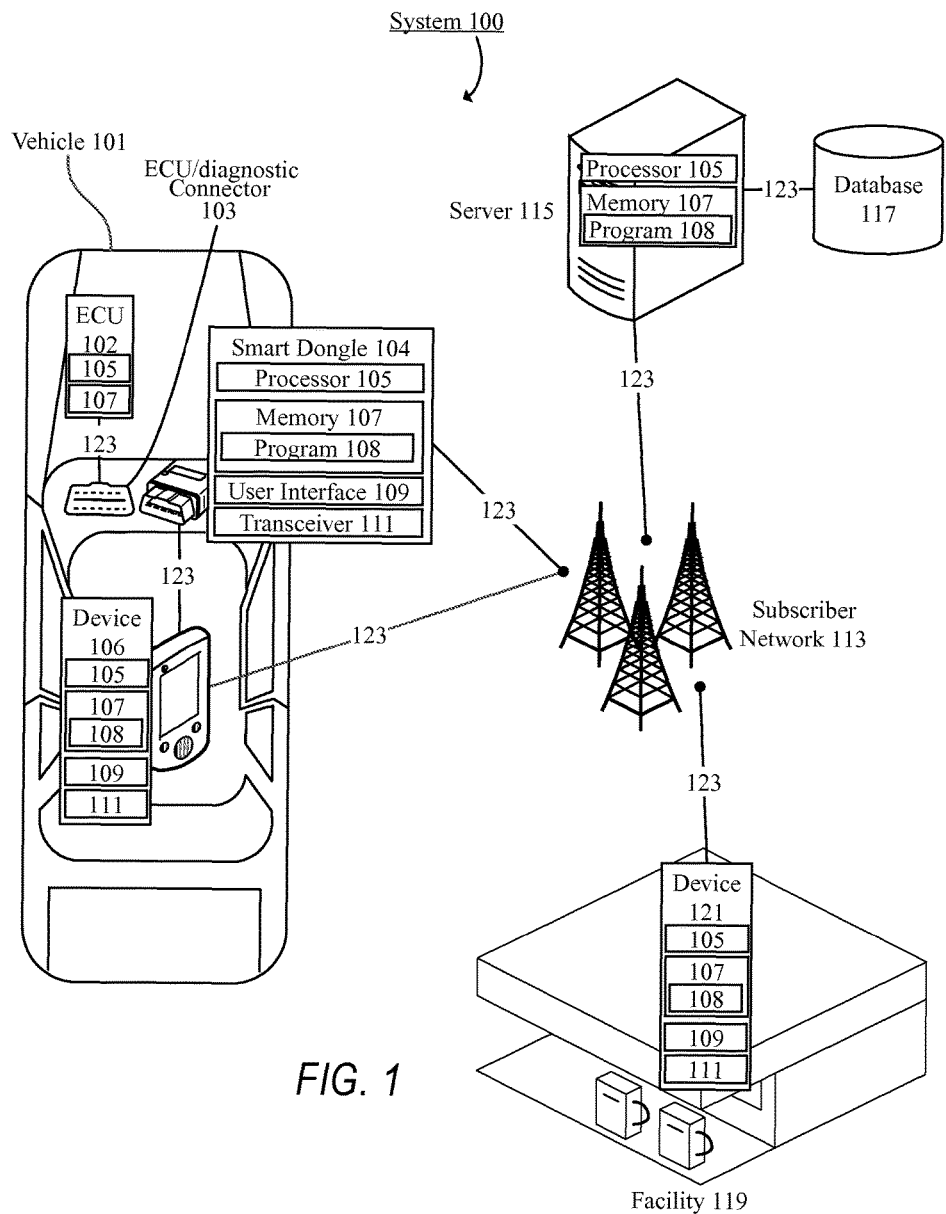
FIG. 1 illustrates an exemplary system of the present disclosure.

A smart dongle may be provided to receive vehicle information such as that associated with an Electronic Control Unit (ECU) of a vehicle. An exemplary smart dongle may comprise a processor, a memory, a program communicatively connected to the processor, and a transceiver. The smart dongle may be configured to receive vehicle information and, e.g., using the transceiver, transmit the vehicle information to a third party device such as an occupant device of an occupant of the vehicle or a subscriber network in communication with a third-party device, e.g., a server and a computing device of one or more facilities. The occupant device may be configured to display the vehicle information, e.g., for real-time or near real-time utilization of vehicle information by the occupant. The server may be configured to receive vehicle information from at least a subset of a plurality of vehicles, aggregate the vehicle information, and send the aggregated vehicle information to at least one vehicle or facility. As a result, the aggregated vehicle information may be utilized to provide enhanced diagnostic capabilities, as described in further detail below.

The vehicle information may include energy information of the vehicle. Energy information may include at least one of fuel information associated with gasoline or diesel fuel utilized to propel the vehicle or electric energy information associated with electric energy utilized to propel the vehicle. An exemplary vehicle may include a conventional vehicle with an internal combustion engine that utilizes fuel stored by a fuel tank, an electric vehicle that utilizes electric energy stored by a fuel cell (e.g., a hydrogen fuel cell), or a hybrid vehicle that utilizes a combination of electric energy and fuel. Thus, the energy information may be associated with vehicles utilizing gasoline, diesel, or electric energy.

For example, the smart dongle, e.g., using the processor, may be configured to read first vehicle information from an ECU/diagnostic connector of a vehicle in communication with the ECU, e.g., indicating a first level (e.g., percentage full) of the fuel of the vehicle's fuel tank or electric energy of the vehicle's fuel cell. The smart dongle may also be configured to read second vehicle information from the ECU/diagnostic connector after a time period, e.g., indicating a second level (e.g., percentage full) of the vehicle's fuel tank or cell. The processor may further be configured to determine an energy consumption based on an energy usage rate during the time period. The processor may also be configured to generate a total energy capacity based in part on the energy consumption and a change between the first level and the second level. The processor may additionally be configured to generate an energy economy based in part on the energy consumption and a traveled distance and, in addition, generate a driving range based in part on the total energy capacity and the energy economy. Accordingly, the processor may be configured to utilize data from an ECU/diagnostic connector to generate vehicle information that may not be directly available from the ECU/diagnostic connector including, for example, the total energy capacity associated with the total fuel or electric energy stored by the vehicle. Thus, the smart dongle may be configured to provide enhanced vehicle information.

FIG. 1 illustrates an exemplary system 100, for example, configured to transfer, aggregate, and utilize vehicle information. System 100 may take many different forms and include multiple and/or alternate components and facilities. While an exemplary system 100 is shown in FIG. 1, the exemplary components illustrated in FIG. 1 are not intended to be limiting. Indeed, additional or alternative components and/or implementations may be used.

As illustrated in FIG. 1, the system 100 may include a vehicle 101, an ECU 102, an ECU/diagnostic connector 103, a smart dongle 104, a device 106, a subscriber network 113, a server 115, a database 117, a facility 119, a device 121, and connections 123. The ECU 102, smart dongle 104, device 106, server 115, and device 121 may include a processor 105 and a memory 107. The memory 107 may include a program 108. The smart dongle 104, device 106, and device 121 may further include a user interface 109 and a transceiver 111.

The vehicle information may include any information related to one or a plurality of vehicles 101 or facilities 119. For example, the vehicle information may include energy information related to an energy (e.g., fuel or electric energy) stored or utilized by or an energy system (e.g., fuel or electric energy system) of one or a plurality of vehicles 101 or facilities 119. The vehicle information may also include location information of the vehicle 101 or facility 119, e.g., within a driving range or a user-predefined distance of the vehicle 101. Exemplary vehicle information may include one or more electronic control unit outputs ("ECU outputs") from the ECU 102, as described in further detail below. The location information may include a vehicle location of one or a plurality of vehicles 101 or a facility location of one or a plurality of facilities 119.

Exemplary vehicle information may also include facility information associated with one or a plurality of facilities 119. The facility information may include a facility list, a pricing list, and location information including a facility location for one or a plurality of facilities 119. The facility list may include a list of facilities 119 (e.g., fuel stations or electric vehicle (EV) charging stations) in a driving range of vehicle 101 based on remaining energy stored in the vehicle (e.g., either an amount of liquid fuel stored in a tank or electricity stored in a battery). The facility list may also include a list of facilities 119 in a user-defined range of the vehicle 101. The facility list may be stored as part of the database 117, which may be accessed by the server 115 and sent to the smart dongle 104 or device 106. The pricing list may include a list of pricing for vehicle products of facilities 119 in the driving range of vehicle 101 or the user-defined range. The pricing list for each facility 119 may further include a fuel price for each octane rating or number (e.g., 87, 89, 91, 93, 98, 100, etc.) or each fuel grade (e.g., regular, midgrade, premium, super, diesel, etc.). The pricing list for each facility 119 may further include an electric energy price for an amount of electric energy. The pricing list may additionally include an offer for a gift (e.g., free coffee for purchasing fuel or electric energy) or special pricing (e.g., a discount based on an amount of fuel or electric energy purchased) from the facility 119. The pricing list may also be stored as part of the database 117, which may also be accessed by the server 115 and sent to the smart dongle 104 or device 106.

The ECU 102 may include any embedded computer system configured to control one or more systems (e.g., a fuel or an electric energy system) of vehicle 101. The ECU 102 may be configured to generate vehicle information such as ECU outputs configured to provide self-diagnostic and reporting capabilities with respect to vehicle 101. The ECU outputs may include one or more on-board diagnostics parameter IDs (PIDs) of vehicle 101. The ECU outputs may also include a mileage including a total traveled distance during a vehicle lifetime of vehicle 101. Exemplary PIDs may include a manifold absolute pressure (MAP), a mass air flow (MAF), an air fuel ratio (AFR), and an energy level percentage (ELP) (e.g., a fuel level percentage associated with fuel of a fuel tank or an electric energy level percentage associated with electric energy of a fuel cell). The ECU 102 may be configured to communicate the vehicle information to the smart dongle 104 using the ECU/diagnostic connector 103. The ECU/diagnostic connector 103 may include any on-board diagnostics connector (e.g., an assembly line diagnostic link (ALDL), on-board diagnostics (OBD-I, OBD-1.5, or OBD-II), European on-board diagnostics (EOBD or EOBD2), Japanese on-board diagnostics (JOBD), or Australian Design Rule (ADR 79/01 or 79/02) connector). An exemplary ECU/diagnostic connector 103 may include a recess or a female connector (e.g., a female OBD-II connector) configured to receive the smart dongle 104.

The smart dongle 104 may include a computing system configured to communicate with any third-party device, e.g., devices 106, server 115, and device 121, or any remote device, e.g., server 115 or device 121. The smart dongle 104 may be configured to be removably received or selectively plugged into the ECU connector 102 in a non-permanent manner by a consumer such as when acting as an "after market" add-on. Thus, the smart dongle 104 may be readily moved from vehicle to vehicle. The smart dongle 104, e.g., using the program 108, may be configured to receive a vehicle information request from device 106, server 115, or device 121, read at least the requested vehicle information from the ECU 102 or ECU connector 102 in response to the vehicle information request, store at least the requested vehicle information as part of memory 107, display vehicle information (e.g., real-time or near real-time as part of the user interface 109), and send at least the requested vehicle information, while being plugged into or connected to the ECU 102 or ECU/diagnostic connector 103 and using the transceiver 111, to the device 106 and the subscriber network 113 in communication with the server 115, database 117, and device 121. An exemplary smart dongle 104 may be configured as any diagnostic code reader device configured to receive information from the ECU 102 of the vehicle 101. The smart dongle 104 may physically connect (e.g., mate or pair) with the ECU/diagnostic connector 103 to communicatively connect with the ECU 102. The smart dongle 104 may include a protrusion or a male connector (e.g., a male OBD-II connector) configured to be received in or plugged into the ECU/diagnostic connector 103 and removed from the ECU/diagnostic connector 103. Thus, the installation is not permanent.

The device 106 may include a computing device such as an occupant device of an occupant of the vehicle 101. The device 106 may also include a third-party device. The device 106, e.g., using the program 108, may be configured to send a vehicle information request (e.g., using the transceiver 111) to the smart dongle 104, server 115, or device 121, receive vehicle information (e.g., using the transceiver 111) from the smart dongle 104, server 115, or device 121, display vehicle information (e.g., real-time or near real-time as part of the user interface 109), and communicate vehicle information (e.g., using the transceiver 111) with the subscriber network 113 in communication with the server 115, database 117, and device 121. The vehicle information of one or more vehicles 101 or facilities 119 may be aggregated and analyzed by the server 115, as described in further detail below. The device 106 may be configured to receive aggregated vehicle information from the server 115, store the aggregated vehicle information as part of the memory 107, and display the aggregated vehicle information to the occupant of the vehicle 101.

The system 100 may include an overall network infrastructure through which the smart dongle 104, devices 106 and 121, subscriber network 113, server 115, and database 117 may communicate, for example, vehicle information or any other information with respect to vehicle 101 or facility 119. For instance, the network infrastructure may generally include edge, distribution, and core devices (e.g., server 115) and enables a path (e.g., connections 123) for the exchange of information (e.g., vehicle information) between different devices and systems (e.g., smart dongle 104, device 106, subscriber network 113, server 115, database 117, and device 121). The connections 123 may be any wired or wireless connections between two or more endpoints (e.g., devices or systems), for example, to facilitate transfer of vehicle information. In general, a network infrastructure comprising system 100 may be a collection of computers and other hardware to establish physical connections and provide the mechanical mechanisms to carry (e.g., transmit and receive) communications.

The overall network infrastructure of system 100 may utilize any networking technology. System 100 may utilize any wired or wireless network or networks. Each network may include a packet network or any other network having an infrastructure to carry communications. Exemplary networks may include one or more of a cellular network, telephone network (e.g., public switched telephone network (PSTN)), global area network, wide area networks, a VoIP network, an LTE network, a VoLTE (Voice over LTE) network, a cellular network, fiber optic network, cable network, television network, local area networks (e.g., Ethernet), wireless local area networks (e.g., radio-frequency (RF), Bluetooth®, or Wi-Fi), power-line networks, or combinations thereof. Although a single system 100 is illustrated, the system 100 may represent a single network, a combination of different networks components and technologies, and/or a plurality of networks.

The subscriber network 113 may include a network infrastructure as discussed above and may be configured to provide communications services to and between a plurality of devices (e.g., smart dongle 104, device 106, server 115, and device 121). The subscriber network 113 may provide communications services, such as packet-switched network services (e.g., Internet access, VoIP (Voice over Internet Protocol) communication services) and location services (e.g., device positioning), to devices connected to the subscriber network 113. The devices on the subscriber network 113 may be associated with subscriber information including subscriber identifiers used to uniquely identify the corresponding devices, such as mobile device numbers (MDNs), mobile identification numbers (MINs), mobile telephone numbers (MTN), common language location identifier (CLLI) codes, Internet protocol (IP) addresses, and universal resource identifiers (URIs), as some non-limiting examples.

The server 115 may include a computing system such as a telematics server. The server 115 may also include a third-party or remote device. The server 115, e.g., using the program 108, may be configured to send a vehicle information request to the smart dongle 104, receive the vehicle information of one or a plurality of vehicles 101 or facilities 119 from the subscriber network 113 in communication with the smart dongle 104, store the vehicle information (e.g., as part of memory 107 or database 117), aggregate and analyze the vehicle information (e.g., using the processor 105) as discussed below, and send the vehicle information to database 117 and the subscriber network in communication with the smart dongle 104 and devices 106 and 121. The server 115 may further be configured to receive a facility list from the database 117 and a pricing list from one or a plurality of facilities 119. For example, the server 115, e.g., a telematics server, may be configured to receive vehicle information from one or a plurality of vehicles 101 or facilities 119 using subscriber network 113, store the vehicle information as part of memory 107 or database 117, aggregate the vehicle information using the processor 105, and send the aggregated vehicle information to one or a plurality of vehicles 101 or facilities 119 using subscriber network 113.

Server 115 may be in continuous or periodic communication with smart dongle 104, device 106, and device 121. Server 115 may include a local, remote, or cloud-based server and may be in communication with devices 121 and receive vehicle information from the smart dongle 104 or the device 106. The server 115 may further provide a web-based user interface (e.g., an internet portal) to be displayed by any of the user interface 109 of device 106 or device 121. The server 115 may communicate the vehicle information with device 106 using a notification, for example automated phone call, short message service (SMS) or text message, e-mail, http link, web-based portal, or any other type of electronic communication. In addition, the server 115 may be configured to store vehicle information as part of memory 107 or database 117. The server 115 may include a single or a plurality of centrally or geographically distributed servers 115.

The facility 119 may include any provider of vehicle products or services associated with vehicle 101 and may include or be associated with the device 121. Exemplary facilities 119 may include energy facilities such as fuel stations and electric vehicle (EV) charging stations, parking facilities such as parking garages or lots, automotive parts stores, and automotive service or repair facilities. Exemplary vehicle products may include fuel (e.g., gasoline or diesel), electric energy, or vehicle parts.

The device 121 may include a computing system such as a facility device of the facility 119. The device 121 may include a third-party or remote device. The device 121, e.g., using the program 108, may be configured to send a vehicle information request to the smart dongle 104, device 106, or server 115, receive vehicle information of one or more vehicles 101 (e.g., using transceiver 111) from the smart dongle 104, device 106, or server 115, store the vehicle information (e.g., as part of memory 107 or database 117), analyze the vehicle information (e.g., using the processor 105) as discussed below, display vehicle information (e.g., as part of the user interface 109), and, e.g., in response to the vehicle information, send facility information (e.g., a facility list, a pricing list, or a facility location) of one or more facilities 119 (e.g., using transceiver 111) to the device 106, subscriber network 113, and server 115. For example, the device 121 may be configured to receive vehicle information of one or a plurality of vehicles, store the vehicle information as part of the memory 107 or database 117, and send facility information to the subscriber network 113, the device 106, and the server 115.

Any or all of smart dongle 104, devices 106 and 121, and server 115 may include telematics devices configured to provide telematics services, for example, using location information (e.g., transceiver 111) and the subscriber network 113. Exemplary telematics services may include vehicle tracking, automatic driving assistance, container tracking, cold storage tracking, fleet management, safety information (e.g., road hazard or weather notifications), emergency warning information (e.g., emergency vehicle notifications), and vehicle status (e.g., a notification of vehicle information or vehicle issues).

The program 108 using the processor 105 (e.g., of smart dongle 104, device 106, server 115, and device 121) may be configured to receive and transfer vehicle information of one or a plurality of vehicles 101 or facilities 119. The program 108 may be configured to receive vehicle information of one or a plurality of vehicles 101 or facilities 119, analyze the vehicle information using processor 105 as discussed below, and store the vehicle information as part of memory 107 or database 117. The program 108 may be configured to coordinate and transfer vehicle information of one or a plurality of vehicles 101 or facilities 119 with one or a plurality of smart dongles 104, devices 106, subscriber networks 113, servers 115, databases 117, and devices 121. The program 108 may communicate the vehicle information (e.g., using transceiver 111 and subscriber network 113) with devices 106, server 115, and device 121 using an notification, for example automated phone call, short message service (SMS) or text message, e-mail, http link, web-based portal, or any other type of electronic communication.

The program 108 may facilitate the distribution of vehicle information including location information between one or more vehicles 101 and one or more facilities 119. For example, the vehicle 101 (e.g., using the smart dongle 104 or device 106) may send vehicle information (e.g., the energy remainder or driving range and vehicle location) of the vehicle 101 to server 115 to be stored and aggregated as part of the memory 107 or database 117. The server 115 may send the aggregated vehicle information from one or a plurality of vehicles 101 to one or a plurality of facilities 119. Alternatively, the vehicle 101 may send the vehicle information including the vehicle location as part of a notification to one or a plurality of facilities 119 (e.g., using the device 121) indicating that the vehicle 101 is near the one or a plurality of facilities 119. In response to the location information of one or a plurality of vehicles 101, the server 115 or device 121 may send a notification to one or a plurality of vehicles 101 (e.g., using devices 106), for example, a pricing list that may include an offer for a gift or special pricing, as described above.

The program 108 using the processor 105 (e.g., of the smart dongle 104, device 106, or server 115) may be configured to analyze initial vehicle information of the ECU 102 and generate additional vehicle information (e.g., also referred to as trip data) after a time period of using vehicle 101. The additional vehicle information, which program 108 using the processor 105 may calculate, may include, for example one or more of the following:

- an energy usage rate associated with fuel or electric energy (e.g., the energy usage rate for fuel being a product of by the air fuel ratio (AFR) and the mass air flow (MAF), or generated based on the manifold absolute pressure (MAP))
- an energy consumption (e.g., an approximated amount of fuel or electric energy consumed over the time period, which may be determined by multiplying the time period by the energy usage rate)
- a total energy capacity (e.g., an approximated maximum amount of fuel or electric energy that a vehicle 101 can hold or store, which may be received by a third-party device (e.g., server 115) or may be determined by the energy consumption divided by a change in a first level percentage (ELP) and a second level percentage (ELP) of ECU 102)
- an energy remainder (e.g., an approximated remainder amount of fuel or electrical energy that a vehicle 101 currently holds, which may be determined by the calculated total energy capacity multiplied by the ELP of ECU 102)
- a traveled distance (e.g., a distance based on an average speedometer reading multiplied by the time period, a difference between a first mileage and a second mileage according to ECU 102, or a traveled distance along a route between a first location and a second location using the transceiver 111 of the smart dongle 104 or device 106)
- an energy economy (e.g., an average rate of fuel or electric energy consumed over the traveled distance by a vehicle 101, which may be determined by the current ELP multiplied by the total energy capacity and divided by the traveled distance)
- a driving range also referred to as a distance to empty (DTE) (e.g., an approximated maximum distance that a vehicle 101 may travel with a current amount of fuel or electric energy, which may be determined by the energy economy divided by the energy capacity).

To further illustrate the analysis described above, the total energy capacity may be determined by Equation 1 below, the energy remainder may be determined by the Equation 2 below, the energy economy may be determined by the Equation 3 below, and the driving range may be determined by Equation 4 below.

$$\text{Energy Capacity} = \frac{\text{Energy consumption}}{\text{First } ELP - \text{Second } ELP} \quad \text{Equation 1}$$

$$\text{Energy Remainder} = \text{Energy Capacity} \times ELP \quad \text{Equation 2}$$

$$\text{Energy Economy} = \frac{(\text{First } ELP - \text{Second } ELP) \times \text{Energy Capacity}}{\text{Distance Traveled}} \quad \text{Equation 3}$$

$$\text{Energy Range} = \frac{\text{Energy Economy}}{\text{Energy Capacity}} \quad \text{Equation 4}$$

The smart dongle 104 may be configured to read and send vehicle information from the ECU/diagnostic connector 103 based on the vehicle information request, as mentioned above, from the device 106, server 115, or device 121. For example, the vehicle information request may request vehicle information that may be directly satisfied by one or more ECU outputs or may require analysis based on one or more ECU outputs. If the requested vehicle information is associated with an ECU output, the smart dongle 104 may read the ECU output and send the ECU output to the device 106, server 115, or device 121. If the vehicle information requests vehicle information that is not directly satisfied by an ECU output, the above analysis may be required to satisfy the vehicle information request. Accordingly, the smart dongle 104 may read the ECU outputs used to perform the analysis, perform the analysis, and send the analyzed vehicle information to the device 106, server 115, or device 121. Alternatively, the smart dongle may read the ECU outputs used to perform the analysis and send the ECU outputs used for the analysis to the device 106, server 115, or device 121, any of which may perform the analysis. Thus, the smart dongle 104 may read and send vehicle information based on the vehicle information request.

The smart dongle 104 or server 115, using program 108, may be configured to send a notification. An exemplary notification may include a low fuel alert (e.g., indicating vehicle information), a facility list and a pricing list, for example, based on an energy threshold. The energy threshold may include a predefined amount or percentage of fuel or electric energy or a predefined distance stored as part of the memory 107 or database 117. An exemplary energy threshold may include an amount of fuel including or between any of 5, 10, and 20 gallons or a distance including or between any of 10, 20, and 50 miles. For instance, the server 115 may receive vehicle information of the vehicle 101 including an energy remainder or driving range and a vehicle location from the transceiver 111 of smart dongle 104 or device 106, compare the energy remainder or driving range to the energy threshold as part of the memory 107 or database 117, and, based on the comparison, send the notification including the low energy alert, facility list, and pricing list to the vehicle 101 or one or more facilities 119 within the driving range. If the energy remainder or driving range is less than the energy threshold, the server 115 may send the notification to the transceiver 111 of smart dongle 104 or device 106. If the energy remainder or driving range is more than the energy threshold, the server 115 may wait to send the notification in response to updated vehicle information. The notification including the vehicle information including the low energy alert, facility list, pricing list, and vehicle location may be displayed as part of user interface 109 of the device 106 or device 121. For example, in response to the notification, the device 106 may provide directions to a facility 119 (e.g., a fuel station, an EV charging station, or a parking space of a parking garage or lot) based on the facility list and the pricing list. As a further example, in response to the notification, the device 121 may offer a gift or special pricing to the vehicle 101, as discussed above. In addition, the smart dongle 104 may receive vehicle information from the server 115, read vehicle information from ECU 101, combine the received vehicle information with the read vehicle information, and send the combined vehicle information to server 115 or facility 119.

For data security, the vehicle information may be encrypted and unencrypted using secure key classes. For example, a key may be included in a text field in a file record as part of the vehicle information or as part of memory 107 or database 117. Using an encryption-decryption algorithm, the key may be encrypted (e.g., by the processor 105 of smart dongle 104, device 106 or 121, or server 115) for transmission of the vehicle information and decrypted (e.g., by the processor 105 of smart dongle 104, device 106 or 121, or server 115) for the receipt of vehicle information. Upon decryption of the vehicle information, the vehicle information may be displayed as part of the program 108 of the smart dongle 104 or devices 106 or 121. As the vehicle information pass through system 100, the vehicle information may be decrypted and unencrypted with an algorithm using the secure key classes. An exemplary encryption-decryption algorithm may include an RSA algorithm that may use a product of prime numbers along with an auxiliary value as a public RSA key to encrypt the vehicle information (e.g. at subscriber network 113 or server 115) and knowledge of the prime numbers as a private RSA key (e.g., as part of database 117 or memory 107 of the device 106 or server 115) to decrypt the vehicle information. In addition, the private RSA keys may be periodically changed to change the working public RSA keys over time or as the vehicle information pass through system 100.

The smart dongle 104, device 106, and device 121 may include a user interface 109. The user interface 109 may include a display, support user interfaces, and/or communicate within the system 100. A display is an output device for presentation of information in visual or tactile form. Examples of a display may include, without limitation, cathode ray tube display, light-emitting diode display, electroluminescent display, touchscreen, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like.

Transceiver 111 may communicatively connect the devices of system 100, for example, using any type of wired or wireless network connection (e.g., connection 123). The wireless network may utilize a wireless transmitter (e.g., cellular, radiofrequency (RF) or Wi-Fi transmitter) of transceiver 111. Transceiver 111 may be configured to communicatively connect any or all of the smart dongle 104, devices 106 and 121, subscriber network 113, and server 115. Transceiver 111 may be used for digital or analog signal transfers. For instance, transceiver 111 may include any antenna technology including cellular, radiofrequency (RF), near field communication (NFC), Bluetooth®, Wi-Fi, or the like. Transceiver 111 may include any technology that implements a wireless exchange of vehicle information by converting propagating electromagnetic waves to and from conducted electrical signals. Transceiver 111 may include any technology that is used to exchange vehicle information wirelessly using radio waves over a radio range or network that enables communication. The transceiver 111 may also include a location determination technology that enables the determination of location information (e.g., a vehicle location or a facility location) or traveled distance (e.g., difference between a first vehicle location and a second vehicle location after a time period) of any of the smart dongle 104, device 106, and device 121, for example, using any location determination technology. Examples of location determination technology may include, without limitation, global positioning systems (GPS), indoor positioning system, local positioning system, and mobile phone tracking.

Any portion of system 100 (e.g., smart dongle 104, device 106 and 121, and server 115) may include a computing system and/or device that includes a processor 105 and a memory 107. Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The system 100 and smart dongle 104, device 106 and 121, and server 115 may take many different forms and include multiple and/or alternate components and facilities, as illustrated in the Figures further described below. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., smart dongle 104, device 106 and 121, and server 115) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, mobile devices, cellular phones (e.g., device 106), smart-phones, super-phones, tablet computers, next generation portable devices, mobile printers, handheld computers, notebooks, laptops, desktops, computer workstations, a server (e.g., server 115), secure voice communication equipment, networking hardware, or any other computing system and/or device.

Further, processors such as processor 105 receives instructions from memories (e.g., memory 107 or database 117) and executes the instructions, thereby performing one or more processes, including one or more of the processes described herein. The processor 105 may be configured to perform operations with respect to vehicle information as described herein. Such instructions, operations, and vehicle information may be stored and transmitted using a variety of computer-readable mediums (e.g., memory 107 or database 117). Processors such as processor 105 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processor 105 may be any one of, but not limited to single, dual, triple, or quad core processors (on one single chip), graphics processing units, visual processing units, and virtual processors.

A memories such as memory 107 or database 117 may include, in general, any computer-readable medium (also referred to as a processor-readable medium) that may include any non-transitory (e.g., tangible) medium that participates in providing vehicle information or instructions that may be read by a computer (e.g., by the processors 105 of the server 115 and devices 106 and 121). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Further, databases, data repositories or other data stores (e.g., memory 107 and database 117) described herein may generally include various kinds of mechanisms for transferring, storing, accessing, and retrieving various kinds of vehicle information, including a hierarchical database, a set of files in a file system, an application database in a proprietary format, a relational database management system (RDBMS), etc. Each such vehicle information store may generally be included within, e.g., memory 107, or external, e.g., database 117, to a computing system and/or device (e.g., smart dongle 104, device 106, server 115, and device 121) employing a computer operating system such as one of those mentioned above, and/or accessed via a network (e.g., system 100 or subscriber network 113) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The computing systems herein may include any electronic hardware that includes a processor 105 and a memory 107 and that is capable of performing the operations discussed herein including the transfer and analysis of vehicle information of one or a plurality of vehicles 101 or facilities 119. To accomplish the operations herein, the computing systems herein may be configured to utilize communications technologies including, without limitation, any wired or wireless communication technology, such as cellular, near field communication (NFC), Bluetooth®, Wi-Fi, and radiofrequency (RF) technologies. Communication technologies may include any technology configured to exchange electronic information by converting propagating electromagnetic waves to and from conducted electrical signals.

Figure 2:
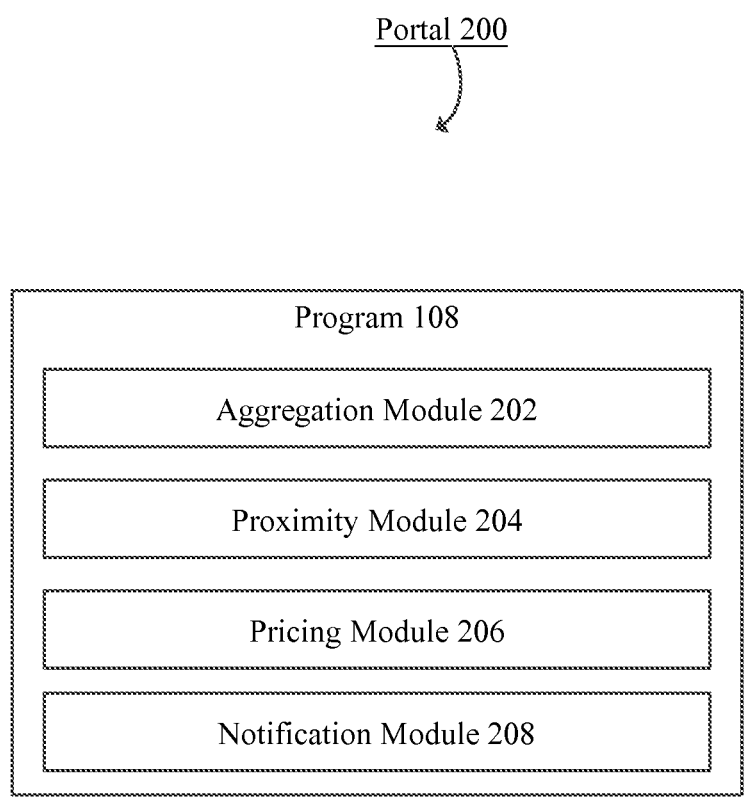
FIG. 2 illustrates an exemplary portal.

FIG. 2 illustrates an exemplary portal 200. The portal 200 may take many different forms and include multiple and/or alternate components and facilities. While an exemplary portal 200 is shown in FIG. 2, the exemplary components illustrated in FIG. 2 are not intended to be limiting. Indeed, additional or alternative components and/or implementations may be used.

As illustrated in FIG. 2, the portal 200 may be provided by program 108 using processor 105 and memory 107 and may include an aggregation module 202, a proximity module 204, a pricing module 206, and a notification module 208.

The aggregation module 202 (e.g., as part of program 108) may be configured to receive (e.g., using transceiver 111), analyze (e.g., using processor 105) as described above, and display (e.g., as part of user interface 109) vehicle information of one or a plurality of vehicles 101 and facilities 119. The vehicle information (e.g., associated with using program 108) may be transmitted from one or a plurality of transceivers 111 (e.g., of one or a plurality of smart dongles 104, device 106, or device 121) to the subscriber network 113 and to the server 115. The server 115 may receive (e.g., using processor 105) and store (e.g., using the memory 107 or database 117) the vehicle information. The server 115 may send the vehicle information (e.g., via subscriber network 113) to one or a plurality of devices 106 (e.g., of vehicles 101) or devices 121 (e.g., of facilities 119).

The proximity module 204 (e.g., as part of program 108) may be configured to receive (e.g., using transceiver 111) and display (e.g., as part of user interface 109) vehicle information including one or more facilities 119 that are near the vehicle 101 or one or more vehicles 101 that are near the facility 119. The program 108 may determine the location information of the vehicle 101 (e.g., using the transceiver 111 of smart dongle 104 or device 106) and compare it to the location information of one or a plurality of facilities 119 (e.g., using the transceiver 111 of each device 121 or an internet address directory). The program 108 may display (e.g., using user interface 109) a facilities list, for example, the facilities 119 in the driving range or a user-defined distance of the vehicle 101.

The pricing module 206 (e.g., as part of program 108) may be configured to receive (e.g., using transceiver 111) and display (e.g., as part of user interface 109) a pricing list associated with one or more facilities 119 that are near the vehicle 101. The device 121 may store the pricing list as part of the memory 107 of the device 121 or send the pricing list to the server 115 to be stored as part of the memory 107 or database 117. For example, in response to the vehicle 101 being near the facility 119, the server 115 or device 121 may send the pricing list to the vehicle 101. As mentioned above, the pricing list for each facility 119 may include a fuel price for each octane rating or number or each fuel grade or an electric energy price. The pricing list may further include an offer for a gift or special pricing for visiting or purchasing products from the facility 119.

The notification module 208 may be configured to receive, display, and send any number of notifications between one or a plurality of vehicles 101 and one or a plurality of facilities 119. As described above, the program 108 may communicate the vehicle information (e.g., using transceiver 111 and subscriber network 113) with devices 106, server 115, and device 121. For example, the vehicle 101 may send location information as part of a notification to one or a plurality of facilities 119 (e.g., using the device 121) indicating that the vehicle 101 is near the one or a plurality of facilities 119, which may be displayed as part of the user interface 109 of the device 121. In response to the location information of one or a plurality of vehicles 101, the server 115 or device 121 may send a notification to one or a plurality of vehicles 101 (e.g., using devices 106), which may be displayed as part of the user interface 109 of the device 106. The notification may include any vehicle information described herein.

Figure 3:
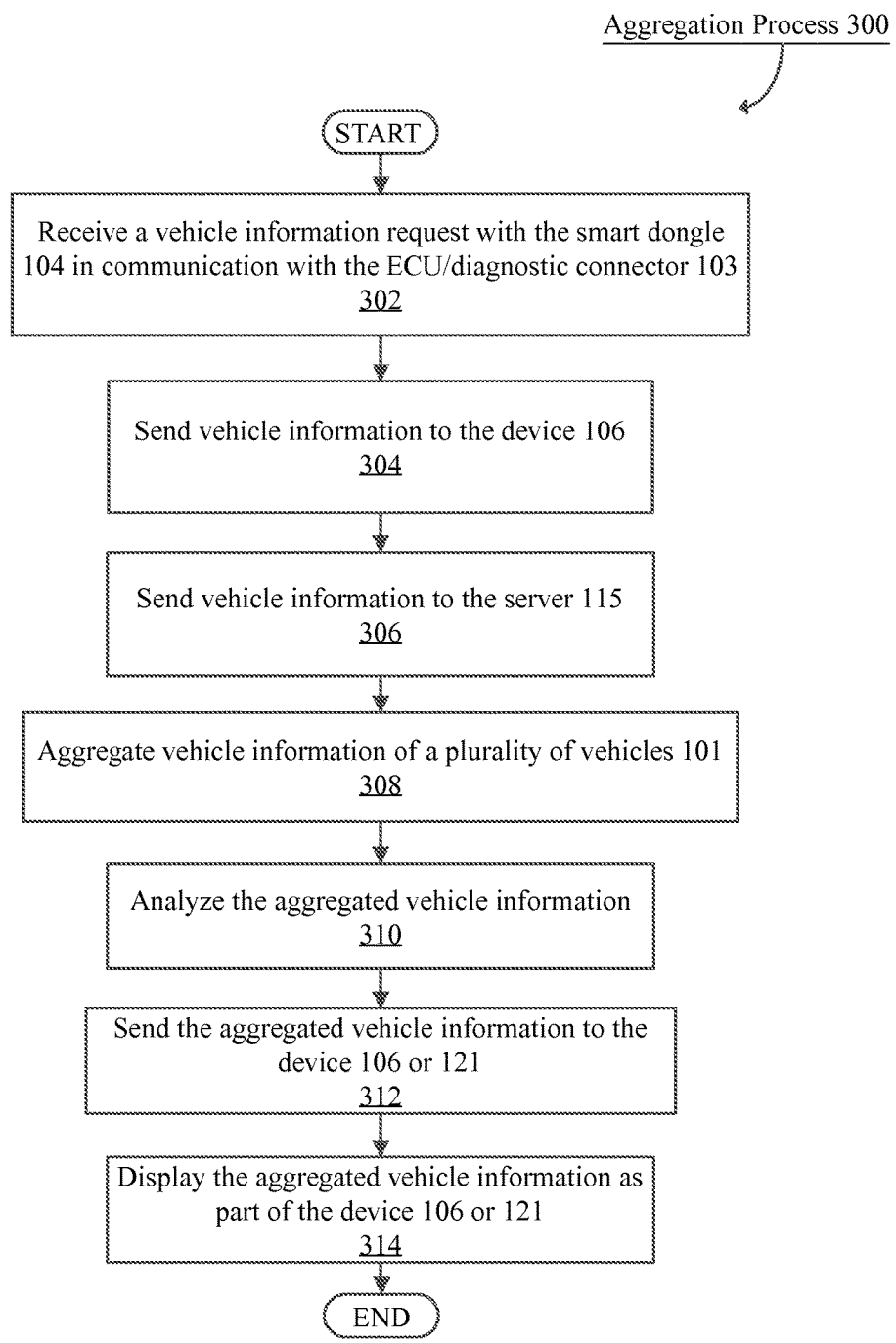
FIG. 3 illustrates an exemplary aggregation process.

FIG. 3 illustrates an exemplary aggregation process 300. Process 300 may take many different forms and include multiple and/or alternate components and facilities. While an exemplary process 300 is shown in FIG. 3, the exemplary components illustrated in FIG. 3 are not intended to be limiting. Indeed, additional or alternative components and/or or implementations may be used.

At block 302, the processor 105, e.g., of the smart dongle 104, receives a vehicle information request from the device 106, server 115, or device 121 using the transceiver 111 of the smart dongle 104.

At block 304, the smart dongle 104, e.g., using the transceiver 111, sends the vehicle information to the transceiver 111 of device 106.

At block 306, the vehicle information is sent to the server 115 using the subscriber network 113, e.g., using the transceiver 111 of smart dongle 104 or device 106.

At block 308, the server 115, using the processor 105, aggregates vehicle information of a plurality of vehicles 101.

At block 310, the server 115, using the processor 105, analyzes vehicle information, as described above.

At block 312, the server 115, using the subscriber network 113, sends the aggregated vehicle information to the transceiver 111 of the device 106 or 121.

At block 314, the device 106, e.g., using the user interface 109, displays the aggregated vehicle information. After block 314, the process 300 ends.

Figure 4:
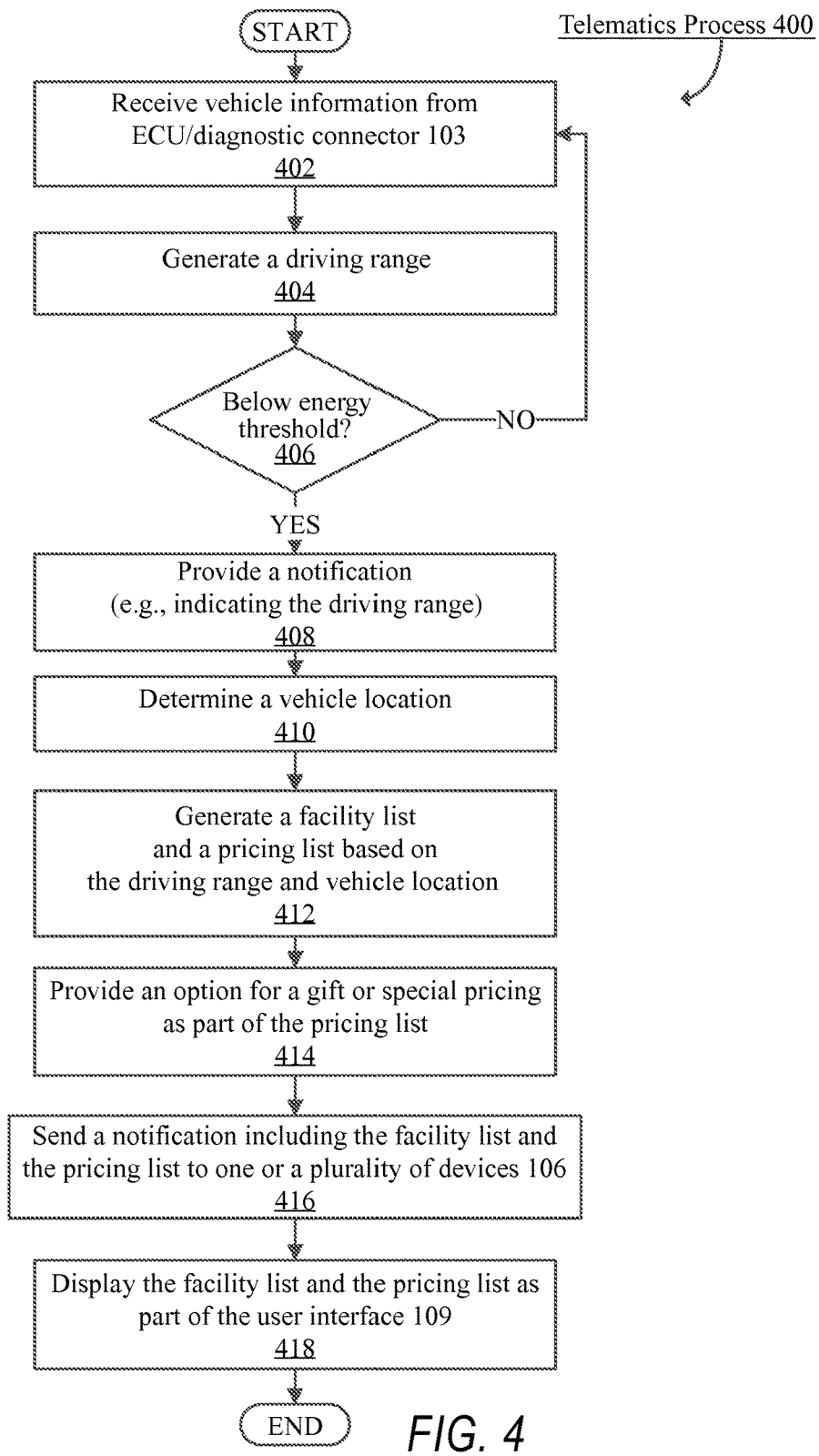
FIG. 4 illustrates an exemplary telematics process.

FIG. 4 illustrates an exemplary telematics process 400. Process 400 may take many different forms and include multiple and/or alternate components and facilities. While an exemplary process 400 is shown in FIG. 4, the exemplary components illustrated in FIG. 4 are not intended to be limiting. Indeed, additional or alternative components and/or implementations may be used.

At block 402, the processor 105, communicatively connected to the ECU/diagnostic connector 103, reads the vehicle information from the ECU/diagnostic connector 103 connected to the ECU 102.

At block 404, the processor 105 generates a driving range, as described above.

At block 406, the processor 105 compares the driving range to an energy threshold. If the driving range is not below the energy threshold, the processor 105 restarts at block 408. If the range is below the energy threshold, the processor 105 provides a notification.

At block 408, the processor 105 provides a notification, e.g., indicating the driving range, to any or all of device 106, server 115, and device 121.

At block 410, the processor 105 determines a vehicle location, e.g., using the transceiver 111 of the smart dongle 104 or device 106. The location information, using the transceiver 111, may be sent to the device 106, server 115, and device 121.

At block 412, the processor 105, e.g., of server 115, generates a facility list (e.g., of fuel stations or electric vehicle (EV) charging stations) and a pricing list (e.g., including fuel or electric energy pricing) based in part on the driving range and the vehicle position, as discussed above. The facility list and pricing list may be sent to the device 106.

At block 414, the processor 105 provides an option for a gift or special pricing as part of the pricing list. For example, the facility 119 may decide to offer a gift or special pricing, which may be saved as part of the pricing list by the processor 105 of the device 121 and sent to the server 115 using the transceiver 111 of the device 121.

At block 416, the processor 105, e.g., of server 115, sends a notification including the facility list and the pricing list to one or a plurality of devices 106, e.g., received with the transceiver 111. The plurality of devices 106 may be in a plurality of vehicles 101.

At block 418, the processor 105, e.g., of device 106, displays the facility list and the pricing list as part of the user interface 109. After block 418, the process 400 ends.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a connector configured to selectively plug into and be removable from an Electronic Control Unit ("ECU") connector of a vehicle; and
   a processor configured to execute instructions, stored in a memory, to:
      read vehicle information from the ECU connector, the vehicle information including:
         information associated with a first energy level, and
         information associated with a second energy level,
            the second energy level being determined after a time period, and
            the second energy level being different than the first energy level,
      the vehicle information being displayed via a user interface of the device, and
      the vehicle information being communicated by at least one of:
         an automated phone call,
         a short message service (SMS) message,
         a text message, email,
http link, or
web-based portal;
determine an energy usage based at least in part on an
energy usage rate,
the energy usage rate being based on the information
associated with the first energy level and the
information associated with the second energy
level;
determine a driving range based at least in part on the
energy usage;
determine a location of the vehicle;
send information associated with the determined driving range and information associated with the location to a remote device;
receive, based on sending the information associated
with the determined driving range and the information associated with the location to the remote
device, a facility list from the remote device;
provide the facility list for presentation;
receive, from the remote device, a pricing list associated with at least one facility, identified in the facility
list, based on the driving range;
receive, from an occupant device, a request for the
vehicle information; and
send, to the occupant device, the vehicle information,
the occupant device including a user interface to
display the vehicle information.

2. The device of claim 1, wherein the remote device includes at least one of a telematics server or a facility device.

3. The device of claim 1, wherein the vehicle information includes at least one of fuel information or electric energy information.

4. The device of claim 3, wherein the processor is further configured to:
generate an energy capacity based at least in part on a
difference between the first energy level and the second
energy level.

5. The device of claim 1, wherein the facility list includes at least one of information identifying an energy facility or information identifying a parking facility.

6. A method comprising:
reading, by a device connected to an Electronic Control
Unit ("ECU") connector of a vehicle, vehicle information from the ECU connector,
the vehicle information including:
information associated with a first energy level, and
information associated with a second energy level,
the second energy level being determined after a
time period, and
the second energy level being different than the
first energy level,
the vehicle information being displayed via a user
interface of the device, and
the vehicle information being communicated by at least
one of:
an automated phone call,
a short message service (SMS) message,
a text message,
email,
http link, or
web-based portal;
determining, by the device, an energy usage based at least
in part on an energy usage rate,
the energy usage rate being based on the information
associated with the first energy level and the information associated with the second energy level;
determining, by the device, a driving range based at least
in part on the energy usage;
determining, by the device, a location of the vehicle;
sending, by the device, information associated with the
determined driving range and information associated
with the location to a remote device;
receiving, by the device and based on sending the information associated with the determined driving range
and the information associated with the location to the
remote device, a facility list from the remote device;
providing, by the device, the facility list for presentation;
receiving, by the device and from the remote device, a
pricing list associated with at least one facility, identified in the facility list, based on the driving range;
receiving, by the device and from an occupant device, a
request for the vehicle information; and
sending, by the device and to the occupant device, the
vehicle information,
the occupant device including a user interface to display the vehicle information.

7. The method of claim 6, wherein the remote device includes at least one of a telematics server or a facility device.

8. The method of claim 6, wherein the vehicle information includes at least one of fuel information or electric energy information.

9. The method of claim 6, further comprising:
generating an energy capacity based at least in part on a
difference between the first energy level and the second
energy level.

10. A computer-readable medium storing instructions, the instructions comprising:
one or more instructions that, when executed by one or
more processors of a device, cause the one or more
processors to:
read vehicle information from an Electronic Control
Unit ("ECU") connector of a vehicle connected to
the device,
the vehicle information including:
information associated with a first energy level,
and
information associated with a second energy level,
the second energy level being determined after
a time period, and
the second energy level being different than the
first energy level,
the vehicle information being displayed via a user
interface of the device, and
the vehicle information being communicated by at
least one of:
an automated phone call,
a short message service (SMS) message,
a text message,
email,
http link, or
web-based portal;
determine an energy usage based at least in part on an
energy usage rate,
the energy usage rate being based on the information
associated with the first energy level and the
information associated with the second energy
level;
determine a driving range based at least in part on the
energy usage;

determine a location of the vehicle;

send information associated with the determined driving range and information associated with the location to a remote device; and receive, based on sending the information associated with the determined driving range and the information associated with the location to the remote device, a facility list from the remote device;

provide the facility list for presentation;

receive, from the remote device, a pricing list associated with at least one facility, identified in the facility list, based on the driving range;

receive, from an occupant device, a request for the vehicle information; and send, to the occupant device, the vehicle information, the occupant device including a user interface to display the vehicle information.

11. The computer-readable medium of claim 10, wherein the remote device includes at least one of a telematics server or a facility device.

12. The computer-readable medium of claim 10, wherein the vehicle information includes at least one of fuel information or electric energy information.

13. The computer-readable medium of claim 12, wherein the one or more instructions, when executed by the one or more processors, further cause the one or more processors to:

generate an energy capacity based at least in part on a difference between the first energy level and the second energy level.

14. The computer-readable medium of claim 10, wherein the facility list includes at least one of information identifying an energy facility or information identifying a parking facility.

15. The device of claim 1, wherein the pricing list includes an offer for a gift or a special pricing.

16. The method of claim 6, wherein the pricing list includes an offer for a gift or a special pricing.

17. The computer-readable medium of claim 10, wherein the one or more instructions, when executed by the one or more processors, further cause the one or more processors to:

receive an offer for a gift or a special pricing.

18. The device of claim 1, where the user interface of the device is a web-based user interface.

19. The method of claim 6, where the user interface of the device is a web-based user interface.

20. The computer-readable medium of claim 10, where the user interface of the device is a web-based user interface.

* * * * *